J. B. SLAWSON.

Fare-Boxes.

No. 5,194. Reissued Dec. 17, 1872.

Witnesses:

T. C. Brecht.

D. G. Stuart

Inventor:

J. B. Slawson by his attorney

P. J. Lannay

AM. PHOTO-LITHOGRAPHIC CO. N.Y. (OSBORNE'S PROCESS.)

UNITED STATES PATENT OFFICE

W. H. McLELLAN, OF NEW ORLEANS, LOUISIANA, ASSIGNOR, BY ME SNE ASSIGNMENTS, TO JOHN B. SLAWSON, OF NEW YORK, N. Y.

IMPROVEMENT IN FARE-BOXES.

Specification forming part of Letters Patent No. 63,804, dated April 16, 1867; reissue No. 3,376, dated April 13, 1869; reissue No. 5,194, dated December 17, 1872.

*To all whom it may concern:*

Be it known that W. H. McLELLAN, of New Orleans, parish of Orleans, and State of Louisiana, hath invented a new and useful Improvement in Fare-Boxes; and I, J. B. SLAWSON, of the city, county, and State of New York, assignee, by mesne assignments, of said W. H. McLELLAN, do hereby declare the following to be a description of the same, reference being had to the annexed drawing making a part of this specification, in which—

Figure 1:
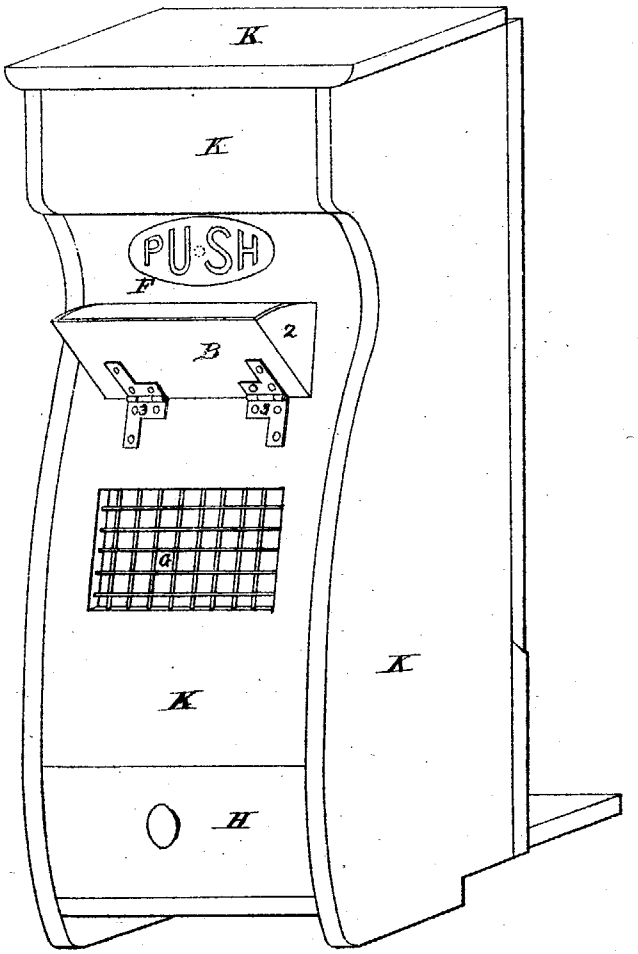
Figure 2:
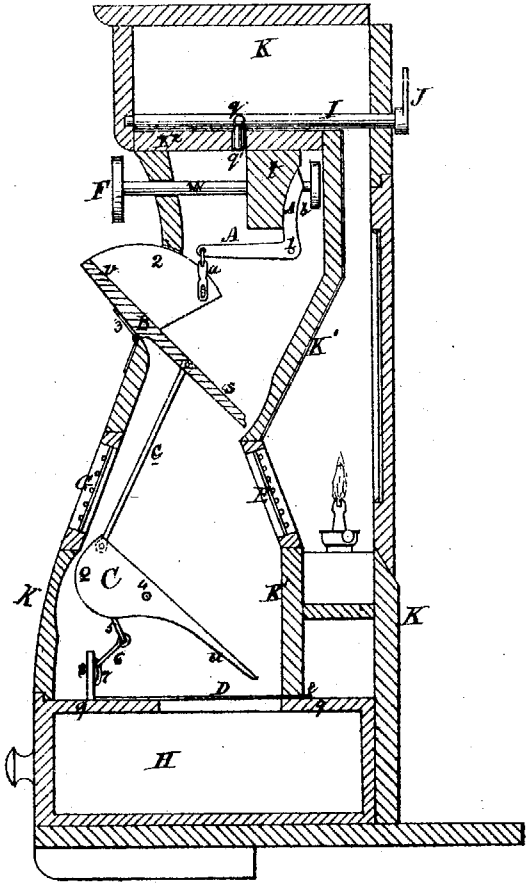

Figure 1 represents a view in perspective of a box having his improvements applied thereto; and Fig. 2, a vertical sectional view of the same.

This invention relates to a new class of fare-boxes devised for the especial purpose of preventing the perpetration of fraud on the part of the drivers or conductors against the proprietors of street-cars, omnibuses, &c.; wherein the former allow the fare to accumulate on the arrest-apron, in the inspecting-chamber of the fare-boxes now in use, and afterward, when at the end of the route, enter the car and abstract the fares by felonious means from the box; and it consists, first, in providing suitable means, hereinafter to be specifically described, by which the passengers, as contradistinguished from the drivers or conductors, in the act of paying their own fare are made the medium of arbitrarily transferring any previously deposited and examined fare from the inspecting to the general receiving chamber below. In other words, it consists in so combining two arrests with the mouth of the fare-box, that when the mouth is opened by the passenger in order to deposit his fare in the box, the act of opening the mouth will have caused the upper arrest to close the throat or channel that leads to the second or lower platform, thereby placing it in position to receive and arrest the fare so deposited; while the same act will have caused the second or lower platform to transfer the previously deposited fare into the channel that leads into the general receiving-chamber below; and vice versa—that is to say, the closing of the mouth will have caused the upper one to transfer the fare just deposited to the second or lower apron, which for this purpose will have been simultaneously acted on, so as to receive and arrest the fare thus transferred by the first, for inspection, and at the same time close the throat that leads to the general receiving-chamber or cash-drawer. It also consists in combining with these devices—that is to say, with the upper and lower arrest-aprons, as above referred to—certain mechanism in such manner that the two, through the action of the passengers to unclose the mouth of the fare-box in order to deposit their fare, will be operated automatically and simultaneously through that act in reverse directions; that is to say, the one will be acted on so as to place it in position to arrest or receive a fare, and the other to deposit one, and vice versa on the closing of the door. It further consists in combining with the upper and lower arrest-aprons, above referred to, a movable lid or cover operated in such manner that it will open and close the mouth of the general receiving-chamber below reversely to the mouth of the box—that is to say, when the latter is open to receive a fare the movable lid will be closed so as to cover or protect the mouth of the general receiving-chamber or drawer below. It also consists in so combining with the second arrest-apron a movable lid or cover in such manner that the latter will be operated automatically by the movement of the former. The invention further consists in the use of a device in connection with the devices which open the mouth of the box for the reception of a fare in such manner as that the driver or other official can at once close, or rather lock, the mouth of the fare-box and thereby prevent the payment of fares during such time as he may be called away or unable to attend to the fare, or when he desires to scrutinize any particular fare more closely. By means of this device disputes between him and the passengers, as to whether their fare had been paid or not, are obviated. The invention further consists in the application of wire netting or other metallic open work, as a protection to the openings in the box, arranged for the use of the drivers and passengers in examining the fare, when arrested for inspection. These perforated metallic windows possess a great advantage over the glass windows in previous use, inasmuch as they do not become obscured by smoke, and are much less liable to be broken either accidentally or by design, and consequently afford a better protection to the fare; and it also consists in combining with each of the inspection-openings of the fare-box individually, or with both conjointly, two movable arrests or covers, arranged below the line of said openings, and operating in such manner as to form a protection to the accumulated fare in the general receiving-chamber, even when the protecting-cover to the inspection-openings has been broken or removed.

To enable others skilled in the art to make, construct, and use this invention, I will now proceed to describe it in detail, omitting a particular description of such parts as are old or common to other fare-boxes.

In making the box such materials may be used as are deemed best adapted for the purpose, such as wood, brass, iron, or any other suitable material, or a combination of such, according to the taste or fancy of the maker and prerequisites of a strong and serviceable box; and it may be made of any convenient external configuration or form. As a rule the outside casing K of the box will be made of wood, and of a form similar to that represented in the drawing, although its dimensions in either direction may be varied according to the requirements of the case. Between the front and rear sides of the outer casing is arranged a partition, $K^1$, of a peculiar curved or zigzag shape, (see Fig. 2,) for a purpose to be hereinafter described. This partition is firmly secured to the inside of the sides or walls of the box in any well-known manner; but I prefer to frame it in as being more secure and firm. Near the upper end of the space formed by the sides of the box and inner casing or partition $K^1$, is arranged a bent lever, A, having its fulcrum on a pivotal rod, 1, secured to or mounted in the sides of the box. The lower end of this lever is connected, by means of a link, *a*, with the rear end of the shield-arm 2 of a combined tilting gate and platform, B, which is pivoted to the front side of the box by means of hinges 3, while the upper end of the lever bears against a cam-block, *t*, mounted and firmly secured upon the sliding rod *w*. The rod *w* itself is passed through an opening formed or cut in the upper end of the front side of the casing, and is provided with a push-knob, F, on the outside of the box and at its front extremity. To the under side of platform end *p* of the gate B is hinged, in any suitable manner, the upper end of a connecting-rod, *c*, the lower end of which is connected in a similar way to the upper side and rear end of another tilting-platform, C, as seen in Fig. 2. The platform C is pivoted to the sides of the box by means of a fulcrum-pin, 4, and is made much thicker at its rear end *o* than at its forward end *u*, so as to make the former much heavier than the latter. The platform end *s* of the gate B is also made heavier than the gate end *v* for the same purpose, and which will be described hereafter. To the under side of the rear end *o* of the platform C is secured one end of an arm or staple, 5, the other end of which is provided with an eye, into which is linked one end of a connecting-link, 6, the other end of which is connected with an elongated staple, 7, or bail, which, in turn, is secured to an upright arm, 8, formed in or firmly connected with the end of a slide-apron, D. This slide D rests upon the top or cover 9 of the money-drawer H, into which the fare, as collected, is accumulated, and passes, at its forward end, through a slot, *e*, formed between the under end of the partition $K^1$ and upper side of the cover 9, and which acts as a guide to the slide. The slide is formed with an open space from near its middle up to the arm 8 that operates it, so that, as it is pushed backward toward the rear or driver's side of the box, the opening is brought immediately over the drawer H to allow the fare to pass into the latter, in which it is assisted by the action of the inner side of the lower end of the partition $K^1$, and which acts as a stripper for that purpose.

Thus connected, the operation is as follows: The passenger, on advancing to pay his fare, pushes on the knob F, which act, through the rod *w* and cam-block *t*, forces back the upper end of the lever A, raising its lower end and with it the link *a*, which, in turn, causes the platform B to turn on its axis 3, thereby establishing an opening at its upper end, through which to deposit the fare into the box, the lower end of the platform meanwhile having been simultaneously raised so as to close the passage to the lower part of the box, and at the same time receive the fare so deposited. In order to insure the closing of the passage to the box below, the partition $K^1$ at that point is so formed as to meet the inner end of the platform B, as shown in Fig. 2. In this position it will remain until the pressure is removed from the knob F. The same movement of the upper platform B will, through the connecting-rod *c*, have caused the platform C to tilt in the opposite direction so as to deposit any fare that may have been previously arrested upon it into the channel that leads to the drawer below; while the slide D will, through the link *d* connecting it with the apron C, have been caused to move so as to cover the mouth of the drawer H and arrest the fare just dropped by the apron C; the operations or movements in all having been simultaneous. Pressure being now removed from the knob F, the tilt B is immediately brought back to its closed or normal position by the superior gravity of the ends *o* and *s* of the tilts C and B, which act will have reversed the positions of the different platforms and slide—that is to say, it will have caused the slide to uncover the mouth of the drawer H—and to deposit therein the fare previously arrested by it; and will have elevated the platform C to a horizontal position so as to receive the fare just dropped by the platform B, which, for this purpose, through the same act, has had its inner end *s* depressed to a nearly vertical position. When the tilt C is in a horizontal position its two ends are intended to extend to the inner sides of the walls of the chamber so as to entirely close the throat that leads to the drawer below.

Instead of weighting the ends *o* and *s* of the aprons C and B so as to close the mouth of the box automatically, the same result may be obtained by the insertion of a helical or other suitable spring at *b*, so arranged as to press constantly against the rear side of the upper end of the lever A, or so as to pull that end of the lever in such direction as to keep the knob F in proper position to be pushed in by the next passenger who wishes to deposit a fare.

No spring is shown in the drawing, nor is it deemed necessary, as any mechanic of ordinary skill will readily perceive how it can be arranged.

When the tilt B assumes its normal position its lower end becomes an inclined plane, down which the fare slides and falls upon tilt C, where it is arrested and exposed to the view of the passengers and driver through openings E and G, covered by metallic lattice-work, until the next fare is deposited. The connection between B and C and between C and D and between B and D is such that when the mouth-end *v* B is open to receive a fare, and its inner end *s* raised to close the throat that leads to the apron C, the latter will be depressed to drop the fare into the drawer, or into the channel that leads to the drawer, or to the slide D. The latter, when apron C is so depressed, has been moved to close the mouth of the drawer. In other words, when the slide D is closed the gate B is open to receive a fare, and the apron C depressed to deposit one; and when the gate B closes to deposit the fare then the platform C rises to a horizontal position to receive it, while the slide D at the same time is withdrawn from the mouth of the drawer in order to deposit the fare therein which had been previously dropped by platform C. It will be perceived that the money deposited upon the platform C remains thereon until the knob F is again pushed in for the payment of another fare. This arrest gives the driver and passengers an opportunity to examine the fare so deposited to see that the amount is correct. This examination is effected through the medium of two openings, E and G, covered by a lattice-screen made of strong steel, iron, or brass wire, so constructed that the interstices are sufficiently large to allow the fare, as it rests on the platform C, to be clearly seen and scrutinized as well by the driver as passengers; for which purpose the opening E is arranged in the rear of the box for the use of the driver, and the other, G, in the front for the use of the passengers.

It will be observed that this lattice of wire affords a far more secure bar against depredators than glass, while at the same time it is free from the obscuration to which glass is subjected from smoking lamps, a lamp, L, being set up in the box K for night service. In fact, it cannot be obscured by smoke, but presents at all times a reliable protective medium through which the fare can be distinctly seen.

If occasion call the driver temporarily away from the car, or if he cannot, from other causes, give his immediate attention to the inspection of the fare, a device is arranged in the box by means of which he can lock the mouth or gate *v* B of the box and thus prevent further payment of fares until such time as he can find opportunity to inspect. In this way disputes are obviated which might otherwise arise, as to whether any particular passenger had or not in reality paid his fare into the box and it been dropped into the drawer below by another passenger in the subsequent act of paying his.

To effect the locking of the mouth of the box a rock-shaft, I, is suitably mounted in bearings arranged in the front and rear sides of the box, its end projecting through the latter to receive a handle or crank-lever, J, by means of which the driver operates it. To this shaft is firmly secured a radially-projecting pin, *q*, and which is so arranged that when the gate *v* B is closed it will be in a line with the rear end of the cam-block *t*, so that by turning the shaft I to depress the pin *q* it will be interposed between the rear end of the cam-block *t* and inner partition $K^1$, the pin *q* in its descent passing through a slot, *q'*, cut for the purpose in the upper partition $K^2$ of the box; from which it will be apparent that when so interposed it will be impossible to push back the knob F in order to open the mouth of the box. Again, instead of locking the mouth when shut it may, if desired, be locked when open by interposing the pin *q* in front of the cam-block *t*, which will effect to a certain extent the same result, as while the mouth is open the inner end of the platform *s* B closes the channel to the inspecting-platform below, and thereby arrests any fare and holds it there until the driver is ready to inspect, when he can, by operating the lever J so as to withdraw the pin *q* from the front of the block *t*, allow the fare to drop upon the apron C, and inspect it there; but the first mode is deemed the better way of effecting the result.

The advantages of this invention are manifold, a few of which may now be briefly pointed out, to wit: It enables the passengers to deposit the fare in the cash drawer or box, and hence enables the driver to give more of his attention to the animal, the car, and passengers, a mere glance at the door being all that is necessary, after each passenger has entered the car, to tell him whether the fare has been paid, or to inspect it. Again, in all other fare-boxes as heretofore made the part corresponding with the tilt C is the last obstruction or stopping place of the fare before it enters the locked cash box or drawer; and this tilt, as each fare is put into the box, the driver is required to operate by pulling a rod in order to deposit it into the cash-drawer; moreover, in doing this an opening is made, through which a hand may be inserted into the cash-box and its contents taken out, should either of the front or rear inspecting-glasses be broken; whereas, by the use of this invention, the extra service and attention of the driver is dispensed with; and an effectual check against dishonesty interposed by the use of the sliding shelf D in connection with the tilt C, when arranged below the line of the inspecting-openings E and G, as all a thief, under such circumstances, could obtain would be the single fare arrested on tilt C. The locking the mouth of the box is also another great advantage, as is also the wire-covered inspecting-openings over the glass-covered openings, as they require no care to keep them clean and clear like the latter, because of smoking lamps, that a good view of the fare may be had.

Having thus described this invention, what is claimed as new, and desired to be secured by Letters Patent, is—

1. The combination, in a fare-box, of the platform B with the levers W and A, or their equivalents, when the former operates at its upper end as a gate, B *v*, and at its lower as an arrest, B *s*, for the purpose set forth.

2. The combination of two arrests, B *s* and C, in such manner that when one is brought into position to arrest a fare the other shall by the same act be operated so as to deposit one, substantially as described.

3. The combination of two arrests, B *s* and C, moving relatively to each other, as set forth, with a device, substantially as described, for operating the same.

4. In combination with two arrests, B *s* and C, moving relatively to each other, as set forth, a device, substantially as described, for automatically reversing their motion.

5. The combination of two arrests, B *s* and C, connected, as described, with devices, substantially as described, for operating and afterward automatically reversing their motion.

6. The combination of a gate, B *v*, with two arrests, B *s* and C, the whole operating in the manner substantially as and for the purposes set forth.

7. The combination of two arrests, B *s* and C, as described, with openings E and G, either singly or combined, protected by a transparent medium, for the purposes set forth.

8. The combination of a gate, B *v*, two arrests, B *s* and C, operating relatively the one to the other, as described, with openings E and G, either singly or combined, when protected by a transparent medium for the purposes set forth.

9. The combination of three arrests, B *s*, C, and D, operating relatively the one to the other, as described, for the purposes set forth.

10. The combination, as described, of a gate, B *v*, with the arrests B *s*, C, and D, the whole operating for the purpose described.

11. The combination of two arrests, C and D, operating relatively, as described, with a fare-box, when arranged between the inspection-openings E and G and the money-drawer, for the purpose set forth.

12. In combination with a gate, B *v*, that closes the mouth of a fare-box, and through which the passengers on the inside of the car deposit their fare, a temporary locking device, substantially as described, when so arranged that the driver or conductor on the outside of the car may lock the gate, for the purpose set forth.

J. B. SLAWSON.

Witnesses:
P. HANNAY,
D. G. STUART.